United States Patent
Cunningham et al.

(10) Patent No.: US 7,379,927 B2
(45) Date of Patent: May 27, 2008

(54) TYPE PATH INDEXING

(75) Inventors: Conor J. Cunningham, Redmond, WA (US); Ramachandran Venkatesh, Bellevue, WA (US); Eric N. Hanson, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/244,018

(22) Filed: Oct. 5, 2005

(65) Prior Publication Data

US 2006/0041574 A1 Feb. 23, 2006

Related U.S. Application Data

(62) Division of application No. 10/692,350, filed on Oct. 23, 2003.

(51) Int. Cl.
G06F 17/30 (2006.01)
(52) U.S. Cl. .................. 707/2; 707/3; 707/4; 707/100; 707/103 R
(58) Field of Classification Search ................ 707/2–4, 707/103, 100, 103 R
See application file for complete search history.

(56) References Cited

U.S. PATENT DOCUMENTS

| | | | |
|---|---|---|---|
| 6,016,497 A | 1/2000 | Suver | 707/103 R |
| 6,209,040 B1 * | 3/2001 | Acton et al. | 719/315 |
| 6,366,934 B1 | 4/2002 | Cheng et al. | 707/513 |
| 6,457,020 B1 * | 9/2002 | Carey et al. | 707/103 R |
| 6,499,036 B1 | 12/2002 | Gurevich | 707/103 R |
| 6,587,856 B1 | 7/2003 | Srinivasan et al. | 707/102 |
| 6,643,633 B2 * | 11/2003 | Chau et al. | 707/1 |
| 7,089,266 B2 * | 8/2006 | Stolte et al. | 707/104.1 |
| 2002/0034333 A1 * | 3/2002 | Vishwanath et al. | 382/253 |
| 2003/0212664 A1 * | 11/2003 | Breining et al. | 707/3 |

OTHER PUBLICATIONS

Wang-Chien Lee, Member, IEEE, and Dik Lun Lee, Member, IEEE, Path Dictionary: A New Access Method for Query Processing in Object-Oriented Database, May 6, 1998, IEEE Transactions on Knowledge and Data Engineering, vol. 10, pp. 1-13.*

Atkinson, Malcolm P., et al., "Types and Persistence in Database Programming Languages," *ACM Computing Surveys*, vol. 19, No. 2, Jun. 1987, pp. 105-190.

Beneventano, Domenico, et al., "Description Logics for Semantic Query Optimization in Object-Oriented Database Systems," *ACM Transactions on Database Systems*, vol. 28, No. 1, Mar. 2003, pp. 1-50.

Meuss, Holger, et al., "Complete Answer Aggregates for Tree-Like Databases: A Novel Approach to Combine Querying and Navigation," *ACM Transactions on Information Systems*, vol. 19, No. 2, Apr. 2001, pp. 161-215.

(Continued)

*Primary Examiner*—Cam Y T Truong
(74) *Attorney, Agent, or Firm*—Woodcock Washburn LLP

(57) ABSTRACT

Efficient hierarchical searching is based on object type. By pre-computing additional information and storing it in a fast-lookup structure, it is possible to quickly identify objects that satisfy an object retrieval request. Furthermore, it is also possible to use this technique to avoid object hydration for operations in the store. Moreover, it is possible to leverage database statistical structures such as histograms to estimate the number of qualifying objects without having to examine each object.

5 Claims, 9 Drawing Sheets

OTHER PUBLICATIONS

Özsoyoğlu, Gultekin, et al., "Query Processing Techniques in the Summary-Table-by-Example Database Query Language," *ACM Transactions on Database Systems*, vol. 14, No. 4, Dec. 1989, pp. 526-573.

Sciore, Edward, "Using Annotations to Support Multiple Kinds of Versioning in an Object-Oriented Database System," *ACM Transactions on Database Systems*, vol. 16, No. 3, Sep. 1991, pp. 417-438.

* cited by examiner

TYPE PATH INDEXING

CROSS REFERENCE TO RELATED APPLICATIONS

This application is a divisional of U.S. application Ser. No. 10/692,350, filed Oct. 23, 2003, now pending, which is hereby incorporated by reference in its entirety and is related to U.S. application Ser. No. 11/244,021, (MSFT-5450/306818.8) entitled "TYPE PATH INDEXING," filed concurrently herewith.

TECHNICAL FIELD

The present invention relates generally to the field of information storage and retrieval, and, more particularly, to efficient hierarchical searching based on object type.

BACKGROUND

Consumers use their computers primarily for communication and organizing personal information, whether it is traditional personal information manager (PIM) style data or media such as digital music or photographs. The amount of digital content, and the ability to store the raw bytes, has increased tremendously; however the methods available to consumers for organizing and unifying this data has not kept pace. Knowledge workers spend enormous amounts of time managing and sharing information, and some studies estimate that knowledge workers spend 15-25% of their time on non-productive information related activities. Other studies estimate that a typical knowledge worker spends about 2.5 hours per day searching for information.

Traditional approaches to the organization of information in computer systems have centered on the use of file-folder-and-directory-based systems ("file systems") to organize pluralities of files into directory hierarchies of folders based on an abstraction of the physical organization of the storage medium used to store the files. The Multics operating system, developed during the 1960s, can be credited with pioneering the use of the files, folders, and directories to manage storable units of data at the operating system level. Specifically, Multics used symbolic addresses within a hierarchy of files (thereby introducing the idea of a file path) where physical addresses of the files were not transparent to the user (applications and end-users). This file system was entirely unconcerned with the file format of any individual file, and the relationships amongst and between files was deemed irrelevant at the operating system level (that is, other than the location of the file within the hierarchy). Since the advent of Multics, storable data has been organized into files, folders, and directories at the operating system level. These files generally include the file hierarchy itself (the "directory") embodied in a special file maintained by the file system. This directory, in turn, maintains a list of entries corresponding to all of the other files in the directory and the nodal location of such files in the hierarchy (herein referred to as the folders). Such has been the state of the art for approximately forty years.

However, while providing a reasonable representation of information residing in the computer's physical storage system, a file system is nevertheless an abstraction of that physical storage system, and therefore utilization of the files requires a level of indirection (interpretation) between what the user manipulates (units having context, features, and relationships to other units) and what the operating system provides (files, folders, and directories). Consequently, users (applications and/or end-users) have no choice but to force units of information into a file system structure even when doing so is inefficient, inconsistent, or otherwise undesirable. Because most existing file systems utilize a nested folder metaphor for organizing files and folders, as the number of files increases, the effort necessary to maintain an organization scheme that is flexible and efficient becomes quite daunting.

Several unsuccessful attempts to address the shortcomings of file systems have been made in the past. Some of these previous attempts have involved the use of content addressable memory to provide a mechanism whereby data could be accessed by content rather than by physical address. However, these efforts have proven unsuccessful because, while content addressable memory has proven useful for small-scale use by devices such as caches and memory management units, large-scale use for devices such as physical storage media has not yet been possible for a variety of reasons, and thus such a solution simply does not exist. Other attempts using object-oriented database (OODB) systems have been made, but these attempts, while featuring strong database characteristics and good non-file representations, were not effective in handling file representations and could not replicate the speed, efficiency, and simplicity of the file and folder based hierarchical structure at the hardware/software interface system level.

Newly developed storage systems, such as "WinFS" (described further below) store the directory of the files as table(s) in a database. Each file is represented by a row in a table, and file system operations, such as "enumerate all files in a directory", are satisfied using queries against the database engine. Thus, efficiently performing basic operations against the store become operations of efficiently optimizing database queries.

In such storage systems, the concept of a file is extended to that of an "object". Metadata about the file is stored in a managed CLR (common language runtime) object with a schema (defined in the storage system) to represent the allowable descriptive data for that object. For example, a picture would have a representative CLR object that would store data such as its resolution, time it was taken, and location information. This object model supports data inheritance. With data inheritance, it is possible to derive a type from another and add new fields. For example, a sub-class of the picture could be created, such as "DriversLicensePicture". Such a sub-class would contain extra information, such as a Driver's License ID field.

In these newly developed storage systems, such as WinFS, the exposed schemas are mapped to tables through a translation layer. Users only see a series of views of the data instead of operating on the base tables. While the exact design of this mapping is not significant, it serves as the glue between the WinFS API and the underlying storage format. Users do not control or see this mapping directly.

The WinFS Store also exposes the concept of querying objects based on their type, as opposed to their file name as in earlier conventional file systems. Type-based queries can search for an exact type or any type that derives from a given type. This latter form is called hierarchical matching, and it is expected to be a common WinFS operation.

WinFS's schema model poses some new challenges to the query processor. User-defined types, or UDTs, are used extensively, and it is common to retrieve all UDTs from a table based on the UDT type. Furthermore, WinFS uses UDT inheritance, and it is also a requirement to retrieve all elements of a given type and also any subtype from a table. Multiple tables exist, each containing a different number of UDTs, types, type topology, and UDT distribution within that topology. These properties make it difficult to make accurate cardinality and cost estimates, and it also makes it difficult to efficiently retrieve values based on type/subtype hierarchy.

In view of the foregoing deficiencies in existing data storage and database technologies, there is a need for efficient type hierarchy retrieval and cost estimation. The present invention satisfies these needs.

SUMMARY

The following summary provides an overview of various aspects of the invention. It is not intended to provide an exhaustive description of all of the important aspects of the invention, nor to define the scope of the invention. Rather, this summary is intended to serve as an introduction to the detailed description and figures that follow.

The present invention is directed to efficient hierarchical searching based on object type. By pre-computing additional special information and storing it in a fast-lookup structure, it is possible to quickly identify objects that satisfy an object retrieval request. Furthermore, it is also possible to use these techniques to avoid expensive object hydration for particular operations in the store. Moreover, it is possible to leverage database statistical structures in new ways to estimate the number of qualifying objects without having to examine each object.

Other features and advantages of the invention may become apparent from the following detailed description of the invention and accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION

Figure 1:
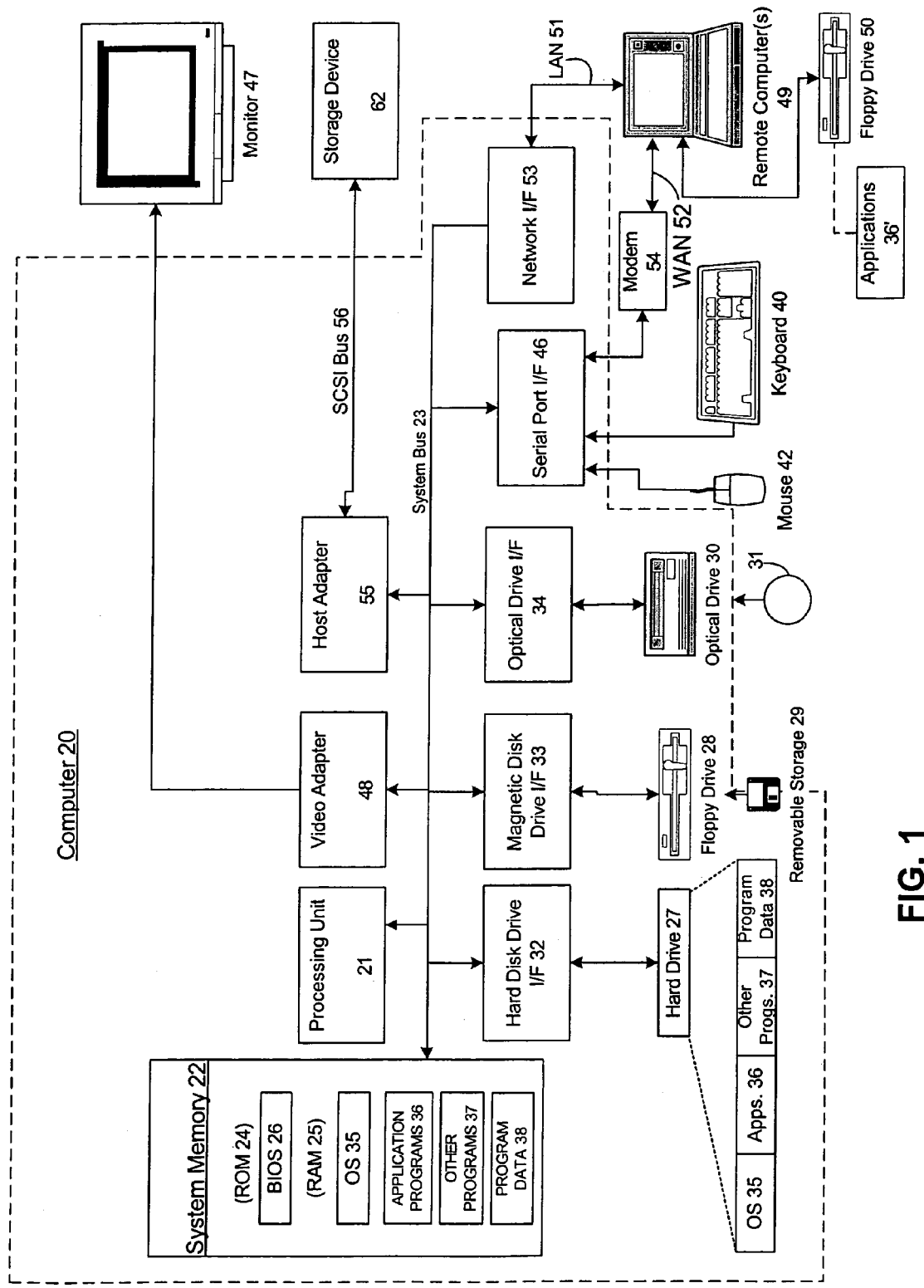
FIG. 1 is a block diagram representing a computer system in which aspects of the present invention may be incorporated.

The subject matter is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described.

Overview

The present invention is directed to efficient hierarchical searching based on object type. By pre-computing additional information and storing it in a fast-lookup structure, it is possible to quickly identify objects that satisfy an object retrieval request. Furthermore, it is also possible to use this technique to avoid object hydration for operations in the store. Moreover, it is possible to leverage database statistical structures in new ways to estimate the number of qualifying objects without having to examine each object.

The present invention provides fast retrieval of values in a table with a specific type, or of values whose type is in a tree rooted at a given type in a type hierarchy. B-tree indexes have the ability to seek to a particular location and retrieve an object having one value (e.g., path type) or a series of objects with the same value. Furthermore, it is also possible to seek on a prefix of an object value and return a range of values all containing the same prefix. These properties can be leveraged to allow efficient retrieval based on either type or type hierarchy.

WinFS is a file system/data store that introduces the concepts of objects in the file system. One of the operations in this store is to be able to efficiently locate and query objects based on their type. The present invention describes how this operation can be made very efficient.

The present invention provides an interface for a built-in function that provides hierarchical type ids for UDTs. A hierarchical type id is a varbinary value that uniquely identifies the type of UDT expression within a type hierarchy. By using this function in queries and in the creation of appropriate computed column indexes, efficient UDT type hierarchy retrieval is supported.

Exemplary Computing Environment

As used herein and in the claims, the following terms have the following meanings:

An "object" is an unit of storable information accessible to a hardware/software interface system that has a basic set of properties that are commonly supported across all objects exposed to an end-user by the hardware/software interface system shell. Objects also have properties and relationships that are commonly supported across all types including features that allow new properties and relationships to be introduced.

An "operating system" (OS) is a special program that acts as an intermediary between application programs and computer hardware. An operating system comprises, in most cases, a shell and a kernel.

A "hardware/software interface system" is software, or a combination of hardware and software, that serves as the interface between the underlying hardware components of a computer system and applications that execute on the computer system. A hardware/software interface system typically comprises (and, in some embodiments, may solely consist of) an operating system. A hardware/software interface system may also comprise a virtual machine manager (VMM), a Common Language Runtime (CLR) or its functional equivalent, a Java Virtual Machine (JVM) or its functional equivalent, or other such software components in the place of or in addition to the operating system in a computer system. The purpose of a hardware/software interface system is to provide an environment in which a user can execute application programs. The goal of any hardware/software interface system is to make the computer system convenient to use, as well as utilize the computer hardware in an efficient manner.

Numerous embodiments of the present invention may execute on a computer. FIG. 1 and the following discussion is intended to provide a brief general description of a suitable computing environment in which the invention may be implemented. Although not required, the invention will be described in the general context of computer executable instructions, such as program modules, being executed by a computer, such as a client workstation or a server. Generally, program modules include routines, programs, objects, components, data structures and the like that perform particular tasks or implement particular abstract data types. Moreover, those skilled in the art will appreciate that the invention may be practiced with other computer system configurations, including handheld devices, multiprocessor systems, microprocessor based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the personal computer 20, such as during start up, is stored in ROM 24.

The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide nonvolatile storage of computer readable instructions, data structures, program modules and other data for the personal computer 20.

Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise wide computer networks, intranets and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

While it is envisioned that numerous embodiments of the present invention are particularly well-suited for computerized systems, nothing in this document is intended to limit the invention to such embodiments. On the contrary, as used herein the term "computer system" is intended to encompass any and all devices comprising press buttons, or capable of determining button presses, or the equivalents of button presses, regardless of whether such devices are electronic, mechanical, logical, or virtual in nature.

Figure 2:
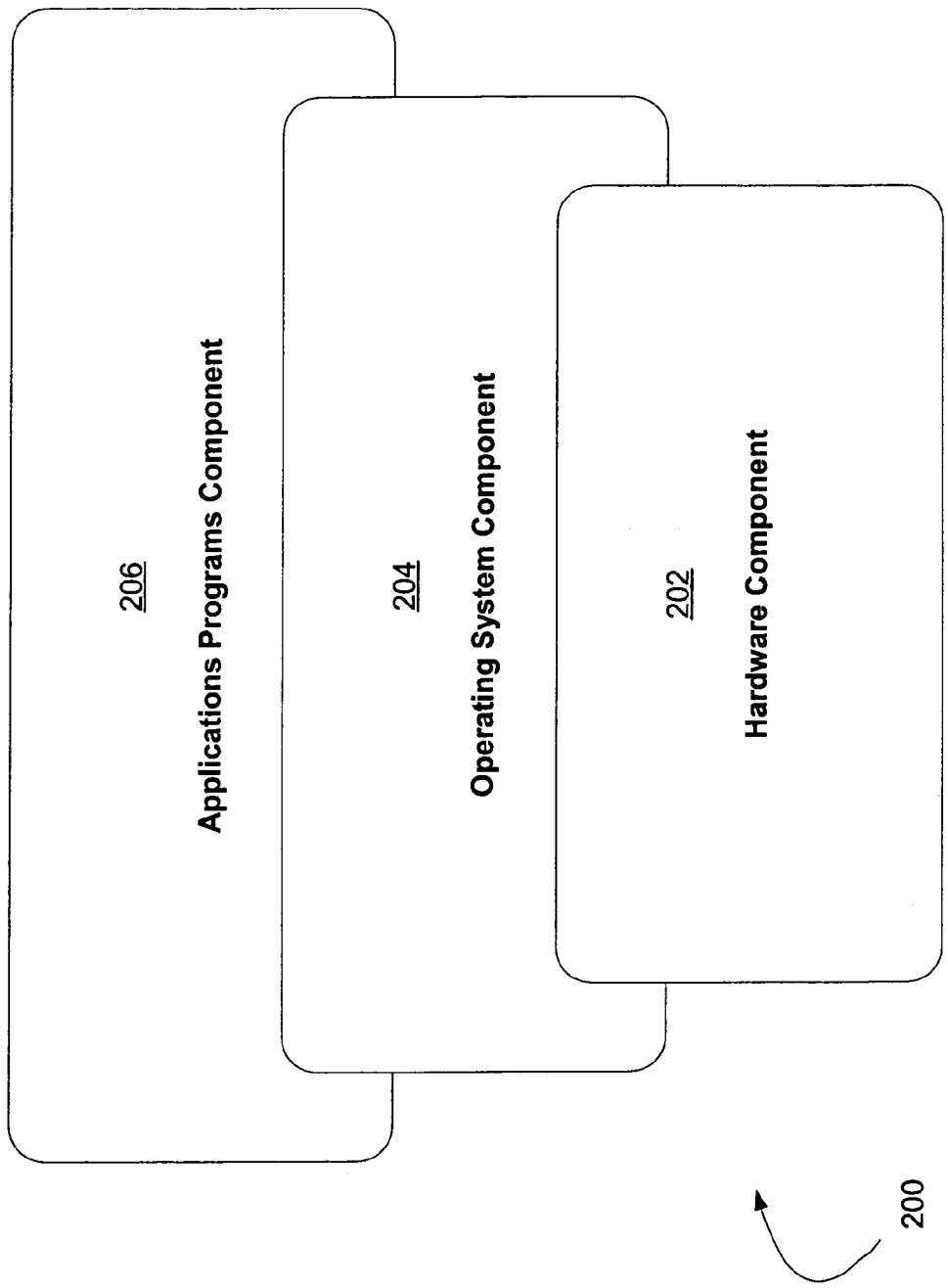
FIG. 2 is a block diagram illustrating a computer system divided into three component groups: the hardware component, the operating system component, and the applications programs component.

As illustrated in the block diagram of FIG. 2, a computer system 200 can be roughly divided into three component groups: the hardware component 202, the operating system component 204, and the applications programs component 206.

In certain computer systems 200, and referring back to FIG. 1, the hardware 202 may comprise the central processing unit (CPU) 21, the memory (both ROM 24 and RAM 25), the basic input/output system (BIOS) 26, and various input/output (I/O) devices such as a keyboard 40, a mouse 42, a monitor 47, and/or a printer (not shown), among other things. The hardware component 202 comprises the basic resources for the computer system 200.

The applications programs component 206 comprises various software programs including but not limited to compilers, database systems, word processors, business programs, videogames, and so forth. Application programs provide the means by which computer resources are utilized to solve problems, provide solutions, and process data for various users (e.g., machines, other computer systems, and/or end-users).

The operating system component 204 comprises the operating system itself and its shell and kernel. An operating system (OS) is a special program that acts as an intermediary between application programs and computer hardware, and the purpose of an operating system is to provide an environment in which a user can execute application programs. The goal of any operating system is to make the computer system convenient to use, as well as utilize the computer hardware in an efficient manner.

The operating system is generally loaded into a computer system at startup and thereafter manages all of the application programs (or simply "applications") in the computer system. The application programs interact with the operating system by requesting services via an application program interface (API). Some application programs enable end-users to interact with the operating system via a user interface such as a command language or a graphical user interface (GUI).

An operating system traditionally performs a variety of services for applications. In a multitasking operating system where multiple programs may be running at the same time, the operating system determines which applications should run in what order and how much time should be allowed for each application before switching to another application for a turn. The operating system also manages the sharing of internal memory among multiple applications, and handles input and output to and from attached hardware devices such as hard disks, printers, and dial-up ports. The operating system also sends messages to each application (and, in certain cases, to the end-user) regarding the status of operations and any errors that may have occurred. The operating system can also offload the management of batch jobs (e.g., printing) so that the initiating application is freed from this work and can resume other processing and/or operations. On computers that can provide parallel processing, an operating system also manages dividing a program so that it runs on more than one processor at a time.

An operating system's shell is the interactive end-user interface to an operating system (and is also known as the "command interpreter"). A shell is the outer layer of an operating system that is directly accessible by application programs and even directly by end-users. In contrast to a shell, the kernel is an operating system's innermost layer that interacts directly with the hardware components.

As well understood by those of skill in the relevant art, "files" are entities of information (including but not limited to the operating system itself, as well as application programs, data sets, and so forth) that are capable of being manipulated as discrete (storable and retrievable) entities by an operating system. In modern operating systems (Windows, Unix, Linux, Mac OS, and so forth), files are the basic units of storable information (e.g., data, programs, and so forth) that are manipulated by the operating system, and groups of files are organized in "folders." In Microsoft Windows, Macintosh, and other operating systems, a folder is a collection of files that can be retrieved, moved, and otherwise manipulated as one entity. In certain other operating systems, such as DOS, z/OS and most Unix-based operating systems, the term "directory" is used rather than folder, and early Apple computer systems (for example, the Apple IIe) used the term "catalog"; however, as used herein, all of these terms are synonymous and interchangeable, and are intended herein to further include all other equivalent terms for and references to hierarchical information storage structures.

Figure 3:
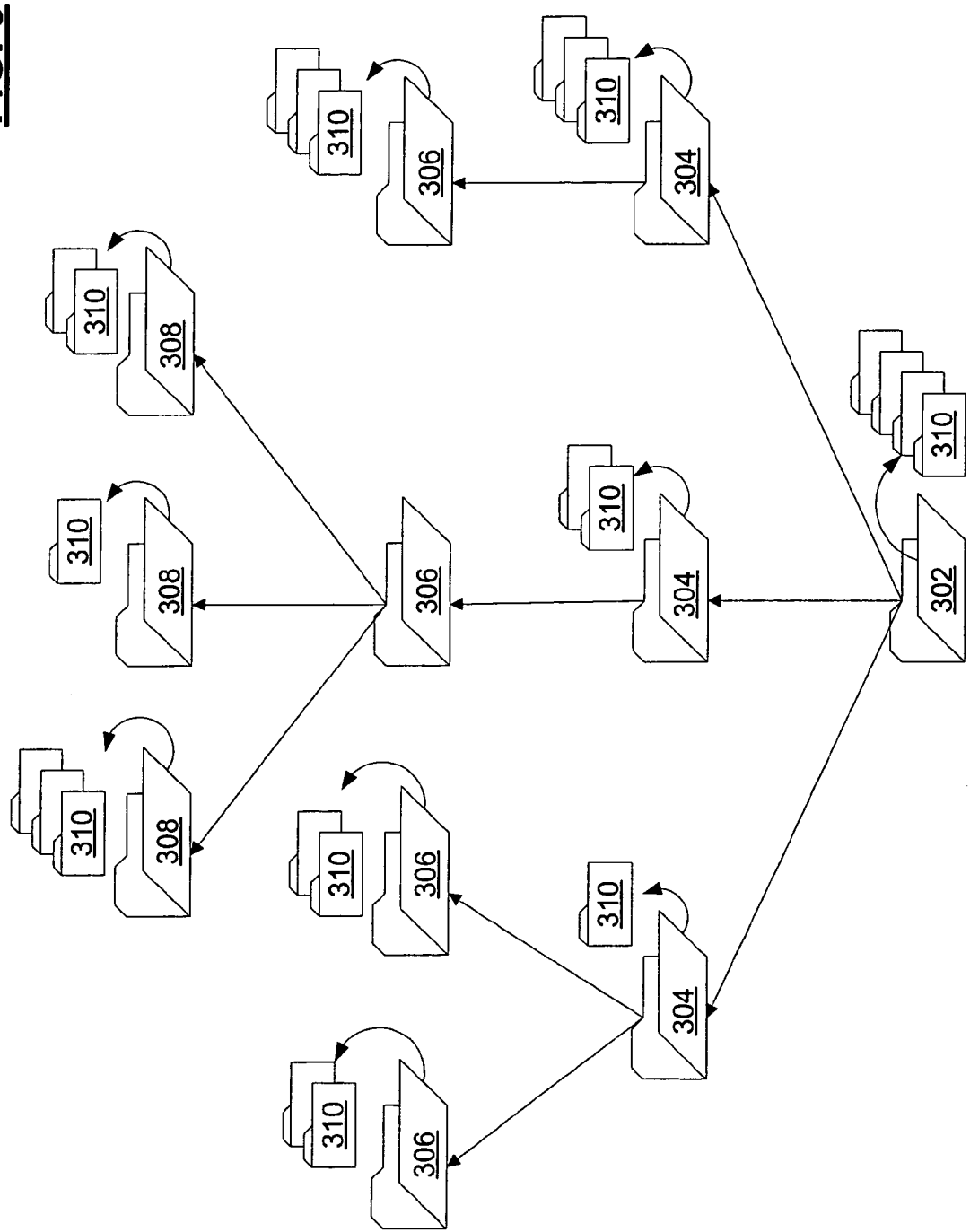
FIG. 3 illustrates a tree-based hierarchical structure for files grouped in folders.

As known and understood by those of skill in the art, a directory (that is, a directory of folders) is a tree-based hierarchical structure wherein files are grouped based on location in the folders which comprise the nodes of the tree structure. For example, as illustrated in FIG. 3, a DOS-based file system base folder (or "root directory") 302 may comprise a plurality of folders 304, each of which may further comprise additional folders (as "subfolders" of that particular folder) 306, and each of these may also comprise additional folders 308 ad infinitum. Each of these folders may have one or more files 310 although, at the operating system level, the individual files in a folder have nothing in common other than their location in the tree hierarchy. Not surprisingly, this approach of organizing files into folder hierarchies indirectly reflects the physical organization of typical storage media used to store these files (e.g., hard disks, floppy disks, CD-ROMs, etc.).

In addition to the foregoing, each folder is a container for its subfolders and its files—that is, the folder owns these subfolders and files. For example, when a folder is deleted by the operating system, its subfolders and files are also deleted (which, in the case of each subfolder, includes its own subfolders and files recursively). Likewise, each file can only be owned by one folder and, although a file can be copied and the copy located in a different folder, a copy of a file is itself a distinct and separate entity that has no direct connection to the original (e.g., changes to the original file are not mirrored in the copy file at the operating system level). In this regard, files and folders are therefore characteristically "physical" in nature because folders are the conceptual equivalents of physical containers, and files are the conceptual equivalents to discrete and separate physical elements inside containers.

Figure 4:
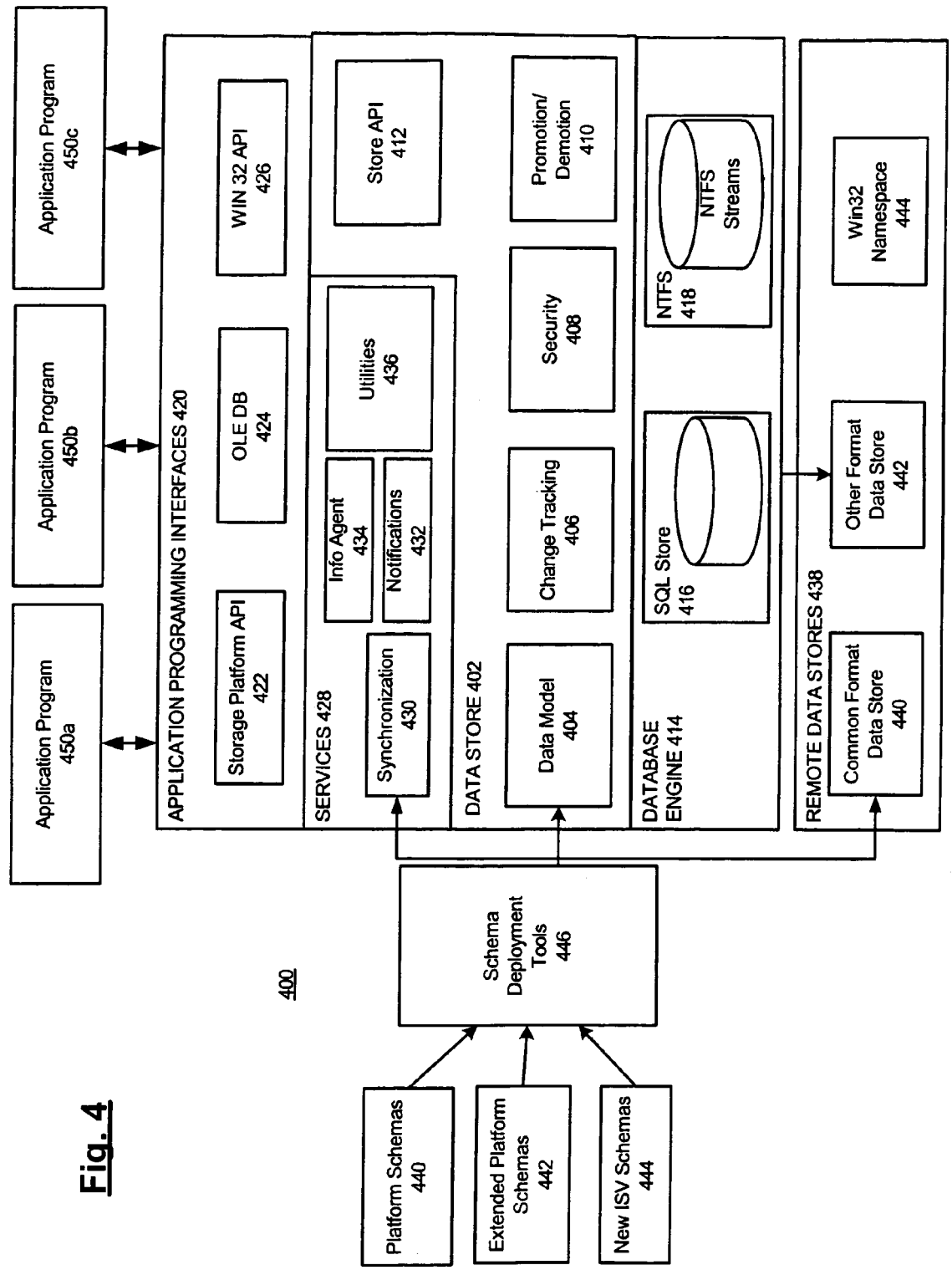
FIG. 4 illustrates an exemplary storage platform that can be used with the present invention.

A storage platform for organizing, searching, and sharing data that can be used with the present invention is designed to be the store for all types of data, including a form of data called objects. Referring to FIG. 4, a storage platform 400 in accordance with the present invention comprises a data store 402 implemented on a database engine 414. In one embodiment, the database engine comprises a relational database engine with object relational extensions. In one embodiment, the relational database engine 414 comprises the Microsoft SQL Server relational database engine.

The data store 402 implements a data model 404 that supports the organization, searching, sharing, synchronization, and security of data. Specific types of data are described in schemas, such as schemas 440, and the storage platform 400 provides tools 446 for deploying those schemas as well as for extending those schemas, as described more fully below.

A change tracking mechanism 406 implemented within the data store 402 provides the ability to track changes to the data store. The data store 402 also provides security capabilities 408 and a promotion/demotion capability 410. The data store 402 also provides a set of application programming interfaces 412 to expose the capabilities of the data store 402 to other storage platform components and application programs (e.g., application programs 450a, 450b, and 450c) that utilize the storage platform.

The storage platform of the present invention still further comprises an application programming interface (API) 422, which enables application programs, such as application programs 450a, 450b, and 450c, to access all of the foregoing capabilities of the storage platform and to access the data described in the schemas. The storage platform API 422 may be used by application programs in combination with other APIs, such as the OLE DB API 424 and the Microsoft Windows Win32 API 426.

The storage platform 400 of the present invention may provide a variety of services 428 to application programs, including a synchronization service 430 that facilitates the sharing of data among users or systems. For example, the synchronization service 430 may enable interoperability with other data stores 440 having the same format as data store 402, as well as access to data stores 442 having other formats. The storage platform 400 also provides file system capabilities that allow interoperability of the data store 402 with existing file systems, such as the Windows NTFS files system 418.

In at least some embodiments, the storage platform 420 may also provide application programs with additional capabilities for enabling data to be acted upon and for enabling interaction with other systems. These capabilities may be embodied in the form of additional services 428, such as an Info Agent service 434 and a notification service 432, as well as in the form of other utilities 436.

In at least some embodiments, the storage platform is embodied in, or forms an integral part of, the hardware/software interface system of a computer system. For example, and without limitation, the storage platform of the present invention may be embodied in, or form an integral part of, an operating system, a virtual machine manager (VMM), a Common Language Runtime (CLR) or its functional equivalent, or a Java Virtual Machine (JVM) or its functional equivalent.

Through its common storage foundation, and schematized data, the storage platform of the present invention enables more efficient application development for consumers, knowledge workers, and enterprises. It offers a rich and extensible programming surface area that not only makes available the capabilities inherent in its data model, but also embraces and extends the existing file system and database access methods.

In the description herein, and in various ones of the figures, the storage platform 400 of the present invention may be referred to as "WinFS." However, use of this name to refer to the storage platform is solely for convenience of description and is not intended to be limiting in any way.

The data store 402 of the storage platform 400 of the present invention implements a data model that supports the organization, searching, sharing, synchronization, and security of data that resides in the store. In the data model of the present invention, an "object" is the fundamental unit of storage information. The data model provides a mechanism for declaring objects and object extensions and for establishing relationships between objects and for organizing and categorizing objects, as described more fully below.

The data model does allow the definition of a subtype-supertype relationship between types. The subtype-supertype relationship is defined in such a way that if Type A is a BaseType for Type B it must be the case that every instance of B is also an instance of A. Another way of expressing this is that every instance that conforms to B must also conform to A. If, for example A has a property Name of Type String while B has a property Age of Type Int16, it follows that any instance of B must have both a Name and an Age. The type hierarchy may be envisaged as an tree with a single supertype at the root. The branches from the root provide the first level subtypes, the branches at this level provide the second level subtypes and so on to the leaf-most subtypes which themselves do not have any subtypes. The tree is not constrained to be of a uniform depth but cannot contain any cycles. A given Type may have zero or many subtypes and zero or one supertype. A given instance may conform to at most one type together with that type's supertypes. To put it another way, for a given instance at any level in the tree, the instance may conform to at most one subtype at that level.

The relational database engine 414, which in one embodiment comprises the Microsoft SQL Server engine, supports built-in scalar types. Built-in scalar types are "native" and "simple". They are native in the sense that the user cannot define their own types and they are simple in that they cannot encapsulate a complex structure. User-defined types ("UDTs") provide a mechanism for type extensibility above and beyond the native scalar type system by enabling users to extend the type system by defining complex, structured types. Once defined by a user, a UDT can be used anywhere in the type system that a built-in scalar type might be used.

The storage platform schemas are mapped to UDT classes in the database engine store. Data store objects are mapped to UDT classes deriving from the Base.Item type. Extensions are also mapped to UDT classes and make use of inheritance. The root Extension type is Base.Extension, from which all Extension types are derived.

A UDT is a CLR class—it has state (i.e., data fields) and behavior (i.e., routines). UDTs are defined using any of the managed languages—C#, VB.NET, etc. UDT methods and operators can be invoked in T-SQL against an instance of that type. A UDT can be the type of a column in a row, the type of a parameter of a routine in T-SQL, or the type of a variable in T-SQL, for example.

The following example illustrates the basics of UDTs. Assume that MapLib.dll has the assembly called MapLib. In this assembly, there is a class called Point, under the namespace BaseTypes:

```
namespace BaseTypes
{
    public class Point
    {
        //returns the distance from the specified point.
        public double Distance(Point p)
        {
            // return the distance between Point p and this Point
        }
        // other stuff in the class
    }
}
```

The following T-SQL code binds the class Point to a SQL Server UDT called Point. The first step invokes "CreateAssembly", which loads the MapLib assembly into the database. The second step invokes "Create Type" to create the User Defined Type "Point" and bind it to the managed type BaseTypes.Point:

CREATE ASSEMBLY MapLib
FROM '\\mysrv\share\MapLib.dll'
go
CREATE TYPE Point
EXTERNAL NAME 'BaseTypes.Point'
go Once created, the "Point" UDT can be used as a column in a table and methods can be invoked in T-SQL as shown below:
Create table Cities(
   Name varchar(20),
   State varchar(20),
   Location Point)
   Retrieve the Distance of the cities
   from co-ordinates (32,23)
Declare @p point(32, 23), @distance float
Select Location::Distance(@p)
From Cities The mapping of storage platform schemas to UDT classes is fairly straightforward at a high level. Generally, a storage platform Schema is mapped to a CLR namespace. A storage platform Type is mapped to a CLR class. The CLR class inheritance mirrors the storage platform Type inheritance, and a storage platform Property is mapped to a CLR class property.

Exemplary Embodiments

A typical data store comprises a table of basic objects, each with a type, such as a UDT. Behavior (also known as methods) can be added to the types. Some of the newer data stores provide inheritance, in which a type can be extended with an additional method to create a new type. For example, a type may be an extension such as ".doc" or "jpeg". Inheritance extensions to these types may be ".doc2" or ".jpg2", for example. The present invention allows a query on typeness (i.e., a query on not only ".doc", but the extensions to ".doc", as well).

Figure 5:
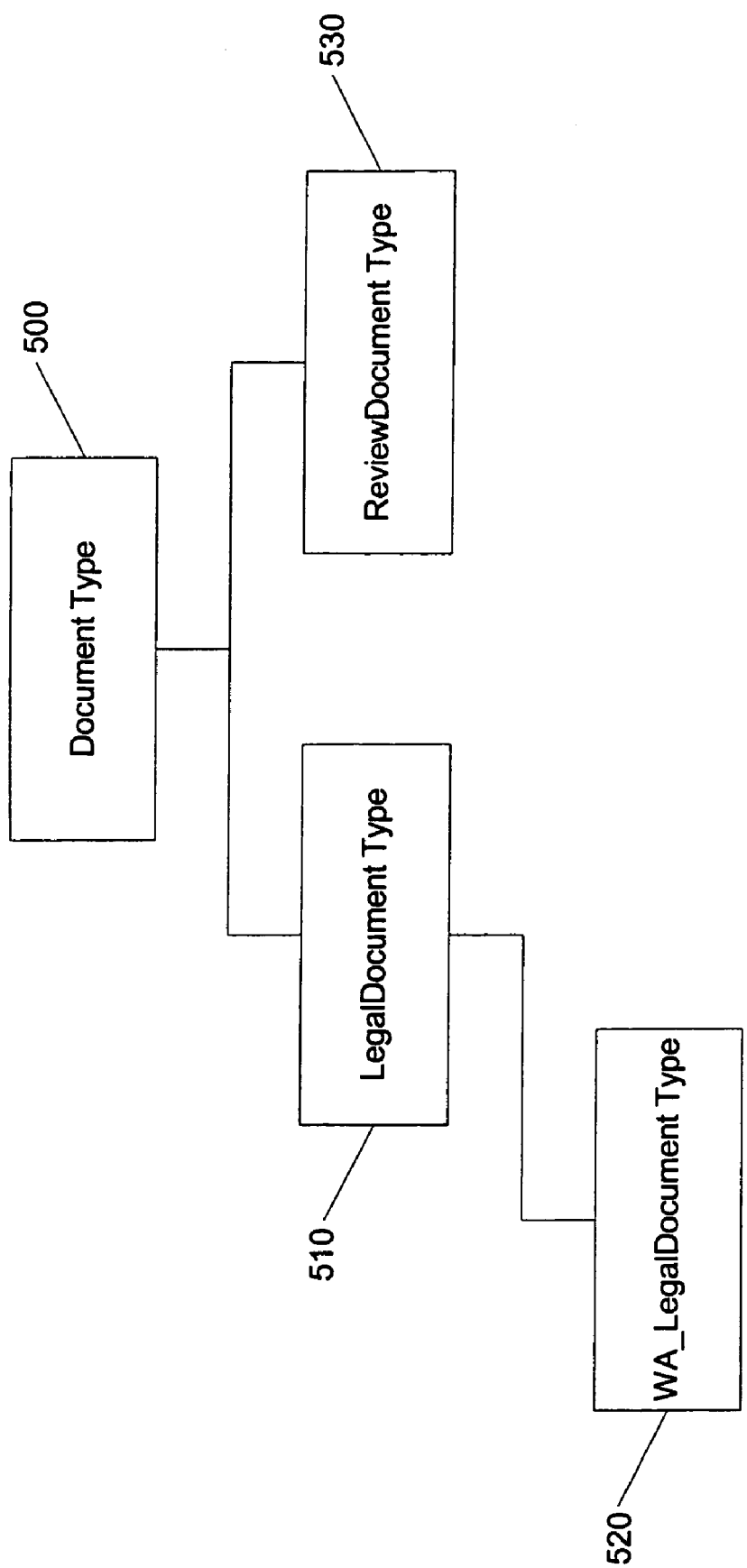
FIG. 5 illustrates a typical hierarchy of objects based on their types and sub-types.

An exemplary inheritance hierarchy of types is shown in FIG. 5. In FIG. 5, the type is "document" 500. "Legal document" 510 and "review document" 530 are shown as subtypes to "document" 500. A subtype of "legal document" 510 is "Washington legal document" 520. A query can be performed on type (e.g., "document") and/or subtypes (e.g., "document" and/or "legal document" and/or "Washington legal document").

A conventional searching technique would use a table with columns, in which one of the columns was a type column for each of the objects in the corresponding object column. To execute a search, the search engine would go through each row, instantiate every object by loading it into memory, and checking the type to determine if there was a match. This technique is very slow, and there is no way to determine the best execution plan to make the search efficient.

Newer searching techniques have computed columns, in which an additional column is provided in the table that has pre-computed values based on the values in the other associated columns. This technique speeds up searching, but requires additional memory to store the additional computed column. A special computed column called a "type path" column can be provided which is a function of the type or UDT. This can be used to search for any type or subtype.

An aspect of the invention is the ability to efficiently search a series of object instances based on type-ness. A value is pre-computed and desirably stores enough information to discern object instances based on their type. This value contains enough information to support either efficient searches for a specific type or for all types in a hierarchy of types (all sharing a common ancestor). Additionally, this value can be used in fast access structures, such as B-trees or other indexing structures, to search for objects based on type or based on type hierarchy.

For each type in the system, a value is desirably assigned to it. The value must at least be unique at each "level" (same depth from the root) of the type hierarchy. For each type, the type value for each parent class is prefixed to the result of all previous prefix operations or the original type if no prefix operations have been performed. All elements at the same level should be stored in the same storage format (length).

When representing an instance of a type, the value is determined as set forth above, and that value is stored with the object. When storing this in a database, the object and the pre-computed value could be stored in separate columns of the same table or other storage structure, such as that shown in Table 1. Table 1 is a sample data type table showing exemplary IDs and their corresponding document types.

TABLE 1

| ID | Document Type |
| --- | --- |
| 1 | Document Instance |
| 1.2 | LegalDocument Instance |
| 1.3 | ReviewDocument Instance |
| 1.2.4 | WA_LegalDocument Instance |

Figure 6:
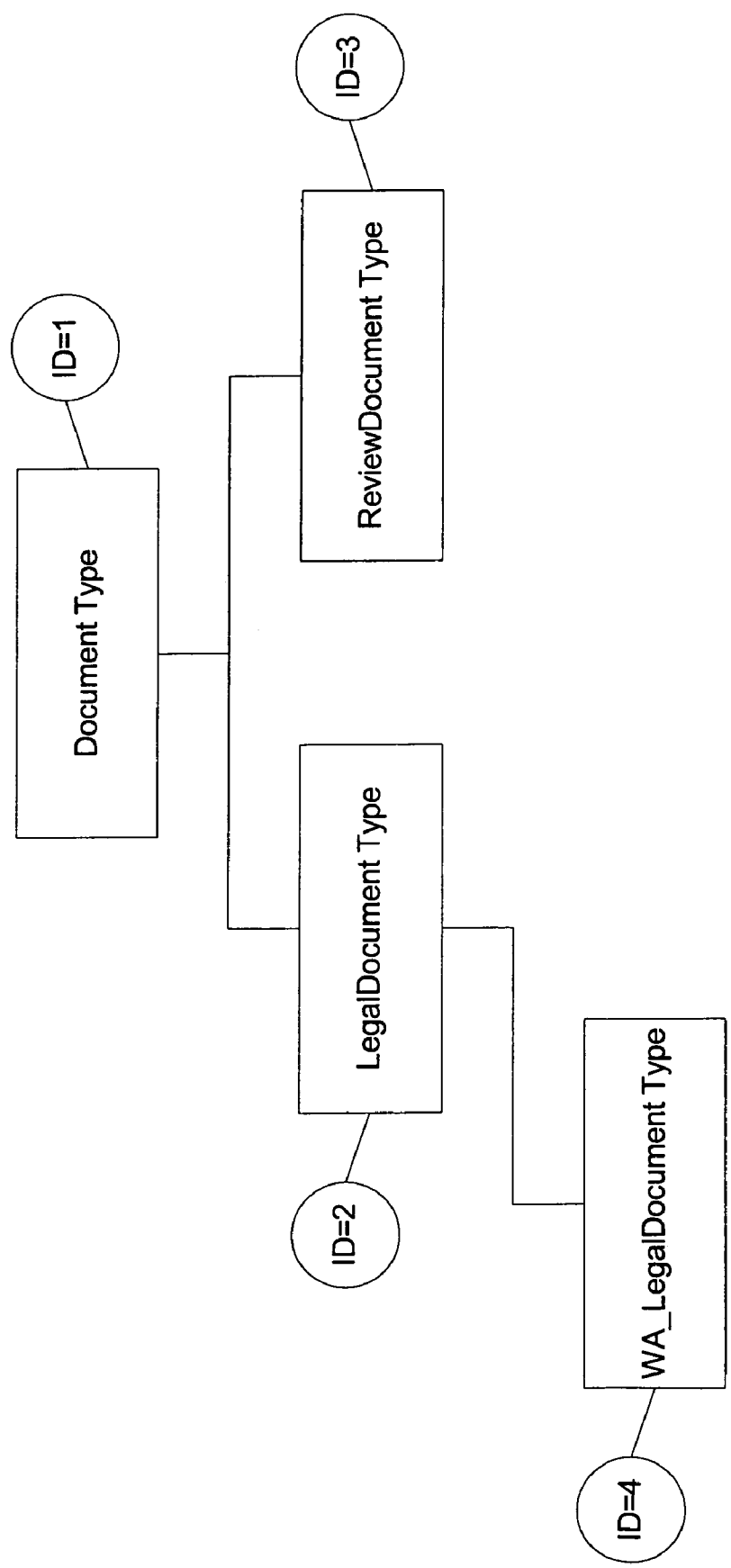
FIG. 6 illustrates an annotated type hierarchy in accordance with the present invention.

Thus, each type is given a number or other identifier, as shown in the annotated type hierarchy of FIG. 6. As shown in FIG. 6, "document" type is given identifier ID=1, "legal document" is given identifier ID=2, "review document" is given identifier ID=3, and "Washington legal document" is given identifier ID=4. Every time an instance of an object is created, the appropriate identifier is appended to the type. So, for example, "document" would be encoded with type path "1", "legal document" would be encoded with "1.2"; and "Washington legal document" would be encoded with "1.2.4", as shown in Table 1.

Table 2, below, shows another exemplary storage table that stores object names, UDTs, and type paths. Every time an instance of an object is created, the appropriate identifier is appended to the type. So, for example, "document" would be encoded with type path "1", "legal document" would be encoded with "1.2"; and "Washington legal document" would be encoded with "1.2.4", as shown in Table 2.

TABLE 2

| Column 1 - Object name | UDT | Type path |
| --- | --- | --- |
| Doc1 | Document | 1 |
| Doc2 | Legal Document | 1.2 |
| Doc3 | Review Document | 1.3 |
| Doc4 | Washington Legal Document | 1.2.4 |

A fast-access storage structure, such as a b-tree index, can be created over the column containing the pre-computed values. This indexing structure desirably has the ability to efficiently find items that contain a given value or a given prefix of a value. While finding a specific value is common, a prefix operation is usually used only to find values of a string, such as the LIKE 'PREFIX %' construct in SQL. The LIKE construct can be efficiently computed using an operation to search for prefixes in an indexing structure.

Such an operation can be used to search for a type and subtypes of the encoded hierarchy. For example, the instruction "LIKE '1.2%'" would find any object having an encoding starting with "1.2" (assuming '%' is a wildcard). Thus, this exemplary instruction, in the present example, would search for and return all objects that are of "legal document" type or "Washington legal document" type.

Operations that need to search for a specific type or type hierarchy can operate on indexes to identify either all objects of a specific type or all objects deriving from a specific type. An equality match on the indexing structure is used for the former, and a prefix match satisfies the latter. This encoding enables fast-lookup for objects based on type or type hierarchy location. B-trees in database systems typically support both of these operations (with the prefix capability used to satisfy LIKE 'aaa %' queries).

According to aspects of the invention, the rows of a data table can be efficiently retrieved. An index on the type path column can be created in the form of a b-tree. For example, all the rows representing type path "1.2" would be stored in a leaf node. The leaf nodes correspond to a table having rows. Comparisons would be made as the b-tree structure is walked down in response to a "seek" command, for example. It is contemplated that the "seek" operation can be used to search on a particular value as well as on a particular prefix.

It is contemplated that an in-memory structure can be used instead of a database structure. An inverted index can be created and a suffix operation can be used. Moreover, a variable-length encoding can be used for each hierarchy level. Furthermore, some non-numeric representation with the same properties can be used.

Using type substitutability, objects of all types could be stored, and searches could be filtered by object type and subtype using the "IS OF (Type)" operator. According to aspects of the invention, an operation predicate such as "IS OF" can be mapped onto the type path column. Other operation predicates can be used such as "IS OF ONLY". Thus, expensive object hydration or instantiation can be avoided.

Pre-computing the value based on the type hierarchy can be used to avoid hydrating an object to determine its type. Assuming that object hydration/instantiation is expensive and that querying by type is common, it is desirable to avoid object instantiation for objects that do not qualify the type restriction. If the type can be encoded in a way that avoids object instantiation and still enables full-fidelity filtering, this can improve the performance.

Furthermore, it is possible to intercept user type-check requests and rewrite them internally to perform equivalent operations against the pre-computed value instead. This can be done for all objects for which the pre-computed value exists.

For an embodiment of fast object discrimination based on type that is implemented in a database system, it is desirable to determine the number of rows in a table where the object is of a given type or any type derived from that type. Conventional techniques for solving this estimation problem include guessing, assuming that all values are equally probable (i.e., a flat distribution) and using table cardinality to create an estimate, or using histograms to track more frequent values and ranges of less frequent values. Typically, histograms are useful to determine how many values exist of a given type. Aspects of the invention estimate selectivity over the whole histogram.

Figure 7:
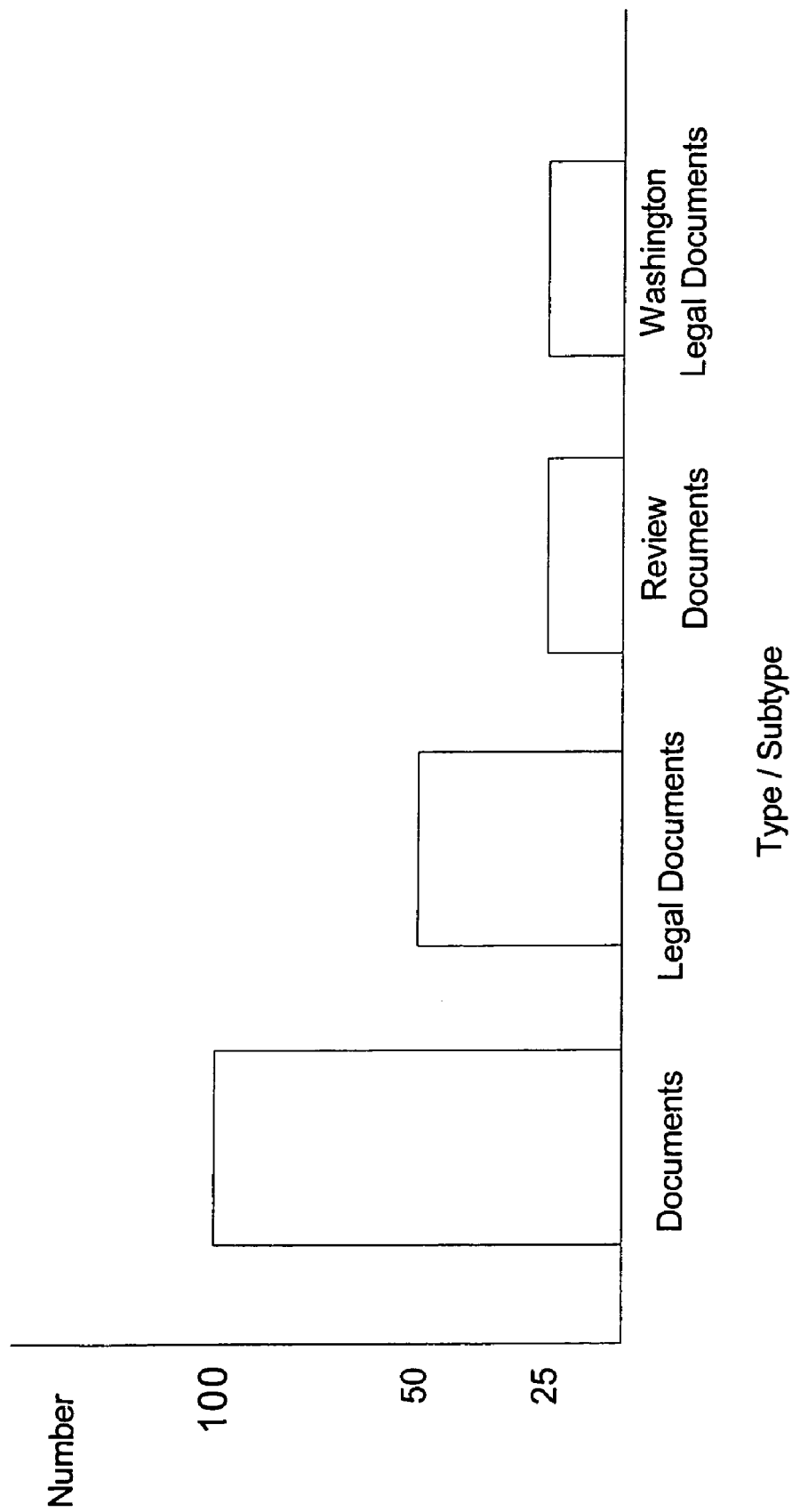
FIG. 7 shows a conventional histogram.

A histogram can be built to estimate how long a query will take. The histogram shows the numbers of objects of each type. An exemplary histogram is shown in FIG. 7. Here, the exemplary numbers of objects of type "document", "legal document", "review document", and "Washington legal document" are shown in histogram format. However, the histogram does not provide the type hierarchy. The type hierarchy could be determined by difficult and expensive look-up techniques.

Figure 8:
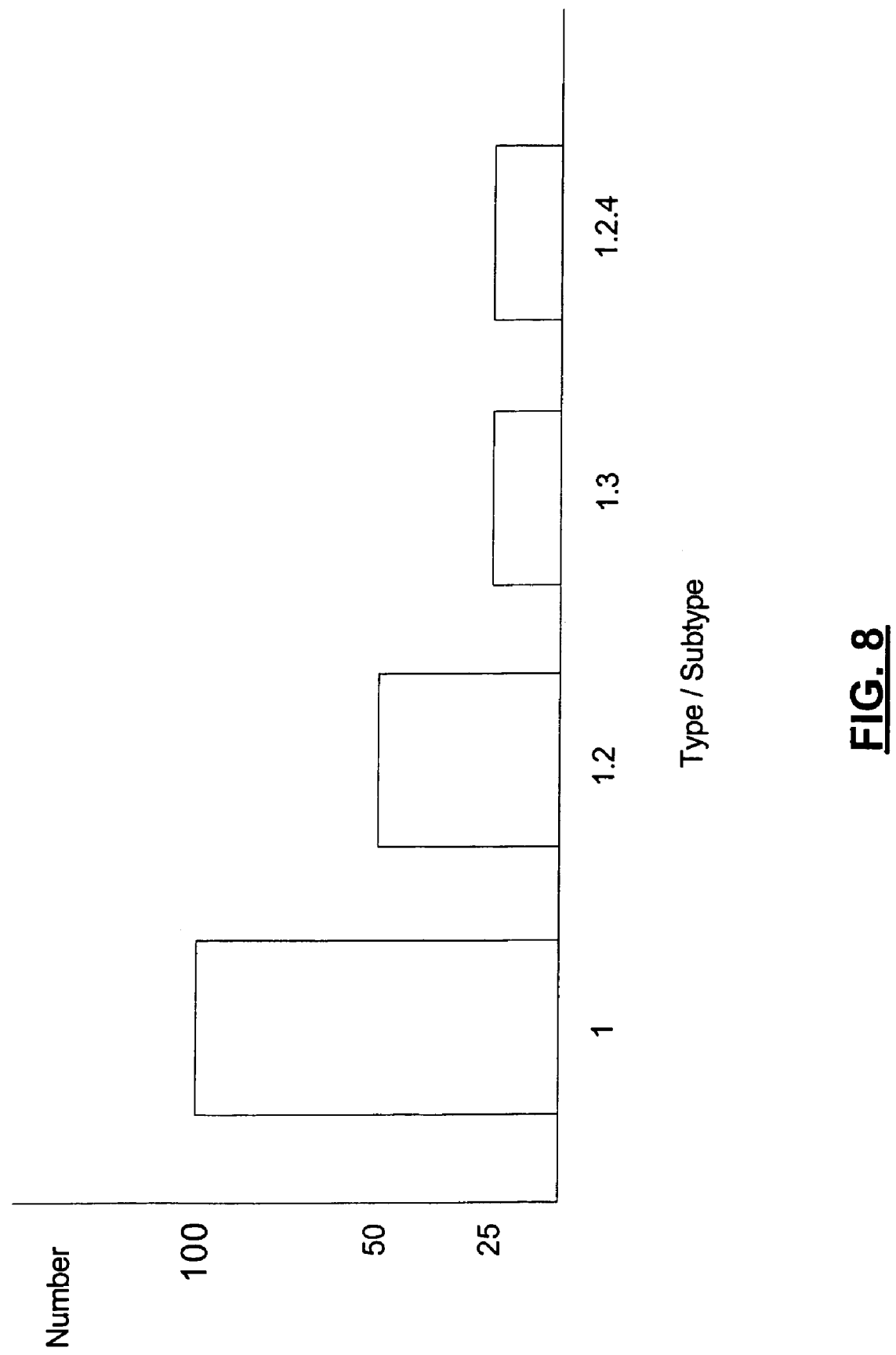
FIG. 8 shows a histogram that can be constructed in accordance with the present invention.

Aspects of the invention are directed to an encoding technique for the histogram, so that the type hierarchy can be discerned without the need for look-up techniques. In accordance with the encoding technique, each type is given a number or other identifier, as shown in the annotated type hierarchy of FIG. 6. Thus, a histogram can be generated in which the hierarchy can be identified using this variable length encoding scheme. For example, as shown in FIG. 8, it can be readily identified that 1.2.4 is a subtype of 1.2, and that 1.2 is a subtype of 1, along with the numbers of each type/subtype.

Figure 9:
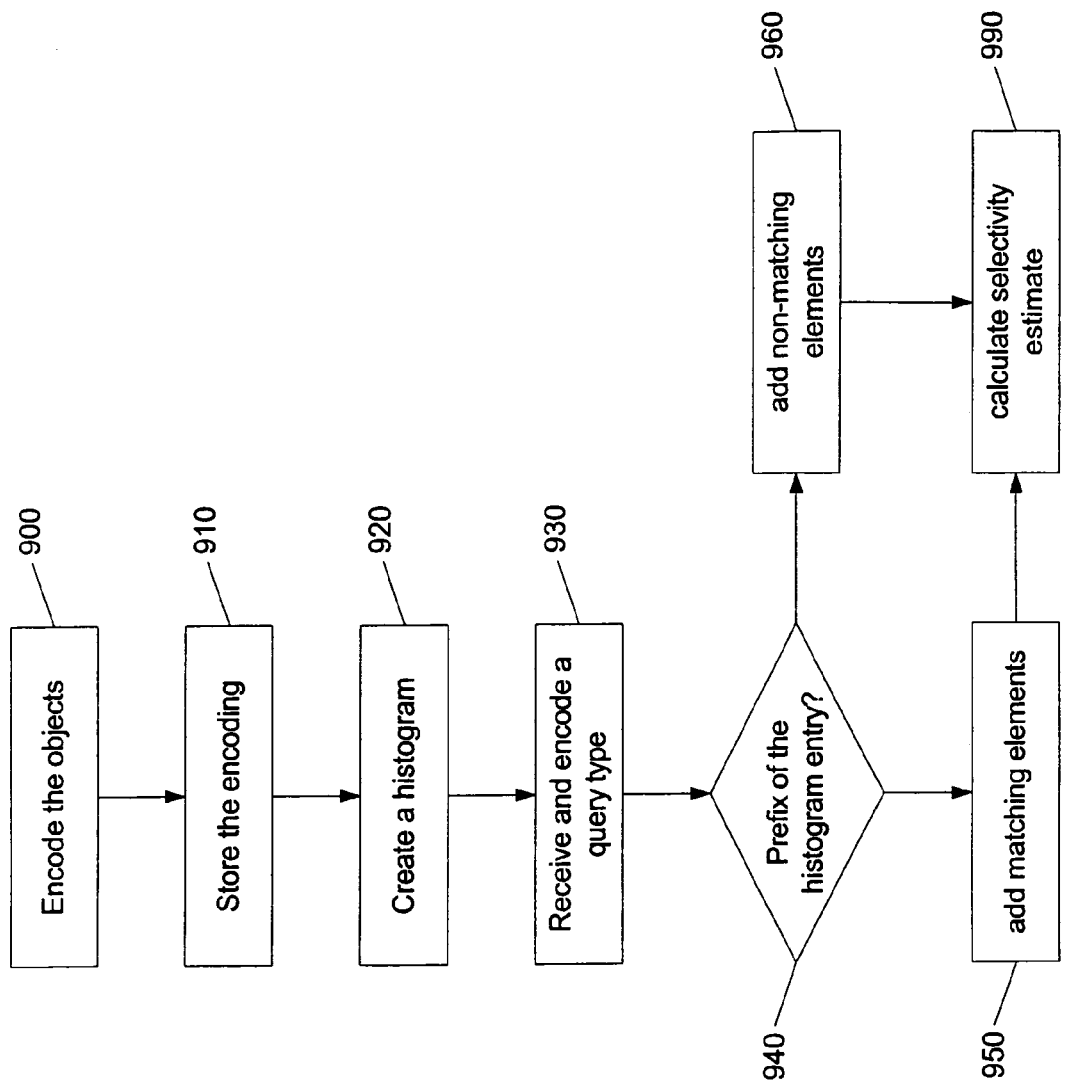
FIG. 9 shows a flow diagram of an exemplary method of generating a selectivity estimate in accordance with the present invention.

FIG. 9 shows a flow diagram of an exemplary method of generating a selectivity estimate in accordance with the present invention. To estimate the selectivity of a type hierarchy query over a set of objects, it is desirable to use the encoding described herein at step 900, store the results of this encoding as a column at step 910, and create a histogram over that column (either separately on the column or as a result of creating an index on the column) at step 920.

Then, at step 930, the query type is encoded, describing which objects to retrieve from a type or any subtype of that type. For each element in the histogram, it is determined at step 940 if the encoded query type is a prefix of the histogram entry. If it is, then at step 950, the number of elements associated with this histogram step is added to the number of other "matching elements" from the histogram. If it is not a prefix, then at step 960, the number of elements associated to this histogram step is added to the "non-matching elements" from the histogram.

When all histogram steps have been processed, the selectivity estimate of this hierarchical type-matching query is determined at step 990, by taking the number of "matching elements" and dividing it by the sum of the number of "matching elements" and the number of "non-matching elements".

Thus, it is possible to use a histogram on this binary encoding to determine statistical information about the distribution of UDTs in the type hierarchy. By walking the histogram during selectivity estimation with knowledge of this hierarchical encoding, a fairly accurate cardinality estimate can be generated for use in the query. It is noted that if an intrinsic function is used to estimate the selectivity per the algorithm described, it should be possible to remove the CLR call to IS OF completely and just do the cardinality estimate on the intrinsic function.

In accordance with the present invention, a function is implemented that returns a type-id from a UDT. Another function returns a hierarchical type-id encoding from a type-id. The storage system, such as WinFS, desirably creates a computed column on every UDT-hosting table (e.g., the object tables). In an embodiment, it is contemplated that the IS OF scalar contains an additional/replacement predicate. For example, the UDT valref could be used to find the base table containing the UDT. Base table computed columns could then be used to determine the existence of a computed column comprising a scalar expression. If such a column is found, an implied predicate would be added.

Each UDT type is assumed to be a small (e.g., 4-byte) fixed-length value. Furthermore, a hierarchical type-id can also be defined as the concatenation of the parent type-ids into a string or binary field. If each row containing a UDT also has a computed column representing this hierarchical encoding, an index can be created over this new column. Operations to return all UDTs in a given type hierarchy can be implemented using a range prefix operation, and exact matches on the type-id can be used to solve non-hierarchical matches.

An exemplary hierarchical type id is provided as the following function:

| Function | Parameters | Result |
|---|---|---|
| HIERARCHICAL_TYPE_ID | (UDT_expression) | A varchar value containing the concatenation of type ids of types along the path from the root of the type hierarchy to the most specific type of UDT_expression. This varchar value can contain non-printing characters. |

UDT_expression can be any user-defined-type-valued expression. The HIERARCHICAL_TYPE_ID function is preferably deterministic and precise. This provides the ability to build indexes on computed columns that were derived using the hierarchical type id. It is contemplated that the computed columns do not have to be made persisted.

To determine if a type path is a prefix of another, the system internally uses a HAS_PREFIX operator that is built using the existing LIKE prefix-scanning capability. This prefix scanning capability is used to implement matching for conditions of the form "character_expression LIKE 'prefix_string %'" where prefix_string is some constant string that does not contain any wildcard characters such as %. This HAS_PREFIX operator desirably is not user-visible. HAS_PREFIX can use an index scan if an index is available.

Hierarchical type id values are desirably short to reduce the amount of data that must be stored in an index. Hierarchical type ids are desirably less than 100 characters long for types in the WinFS schema.

It is desirable that the function to retrieve a hierarchical type id given an internal type id is fast because it is used during index creation.

Preferably, a type cannot be dropped or otherwise deleted while instances of it remain in the database (i.e., if it or any of its ancestors are used in the definition of a table that still exists). Otherwise, index entries containing the hierarchical type id of a dropped type might remain in indexes, but it would not be possible to interpret them. Furthermore, adding a new type after dropping one might result in a hierarchical type id that was the same as that of an existing instance, causing an error.

The internal format of a hierarchical type id shall preferably be a varbinary value whose length is a multiple of 4 bytes, containing the concatenation of type ids (stored internally as 4-byte integers, for example) of types along the path from the root of the type hierarchy to the most specific type of UDT_expression.

In the case of a large table with an attribute whose values are of a user-defined type, it may be desirable to support fast retrieval of rows where values of that attribute have a specific type, or are a subtype of a given type. To support fast search in this situation, an index can be created on a computed column created using HIERARCHICAL_TYPE_ID.

Assume the following type hierarchy of UDTs:
 CREATE TYPE person_t EXTERNAL NAME [asm]:[Person]
 CREATE TYPE employee_t EXTERNAL NAME [asm]:[Employee] UNDER person_t
 CREATE TYPE hourly_employee_t EXTERNAL NAME [asm]:[HourlyEmployee] UNDER employee_t
 CREATE TYPE salaried_employee_t EXTERNAL NAME [asm]:[SalariedEmployee] UNDER employee_t Furthermore, there is a table defined as follows:
 CREATE TABLE person(pcol person_t)

To enable fast lookup of person rows while filtering on the type of pcol using the IS OF operator, a computed column and index on the hierarchical type id for person.pcol of the person table can be added as follows:
 ALTER TABLE person ADD pcol_htid AS HIERARCHICAL_TYPE_ID(pcol)
 CREATE INDEX person_htid_idx ON person(pcol_htid)

This will, for example, allow a user to rapidly find all information about hourly employees even if the "person" table is large.

A CLUSTERED index on HIERARCHICAL_TYPE_ID can be created if fast retrieval of all values of a given type is a high priority. Making the index CLUSTERED will group values of the same type, or in the same subtree of the type hierarchy, on the same page or on nearby pages on disk.

For query rewrite, it is contemplated to include a general statement that IS OF predicates are implemented internally via the HIERARCHICAL_TYPE_ID, and that an index on a computed column derived from HIERARCHICAL_TYPE_ID can help speed up queries on type that use the IS OF operator.

The system uses query rewrite internally to process IS [NOT] OF predicates, also known as type predicates. A desired format of a type predicate is defined as follows:
 Type_predicate ::=UDT_expression IS [NOT] OF (Type_list)
 Type_list ::=user_defined_type_specification [, . . . n]
 User_defined_type_specification
   ::=Inclusive_UDT_specification|Exclusive_UDT_specification
 Inclusive_UDT_specification ::=UDT_name
 Exclusive_UDT_specification ::=ONLY UDT_name
 An expression of the form
 UDT_expression IS NOT OF (type_list)

is equivalent to
 NOT (UDT_expression IS OF (type_list))
 A type predicate of the form
 UDT_expression IS OF (type_list)

is rewritten as a disjunction of predicates testing whether the type of UDT_expression matches the entries in type_list.

A test to determine if UDT_expression IS OF an Inclusive_UDT_specification is expressed in the rewritten query as:
 HIERARCHICAL_TYPE_ID(UDT_expression)
   HAS_PREFIX
 <<constant hierarchical type id of UDT_name>>

Here, <<constant hierarchical type id of UDT_name>> is a varbinary constant representing the hierarchical type id of UDT_name.

A test to see if UDT_expression IS OF an Exlusive_UDT_specification is expressed in the rewritten query as:
 HIERARCHICAL_TYPE_ID(UDT_expression)=
 <<constant hierarchical type id of UDT_name>>

It should be noted that the HIERARCHICAL_TYPE_ID (UDT_expression) expression in the rewritten conditions above will match an index on a computed column built from the same expression, such as person_htid_idx.

The following examples show application of the rewrite rules described above to support IS OF and IS OF (ONLY . . . ) predicates.

Find all persons who are employees of any kind
SELECT * FROM person WHERE pcol IS OF employee_t
Rewritten query:
SELECT * FROM person
WHERE HIERARCHICAL_TYPE_ID(pcol)
   HAS_PREFIX <<constant hierarchical type id of employee_t>>

Find all persons who are of type employee_t but not one of its subtypes.
SELECT * FROM person WHERE pcol IS OF (ONLY employee_t)
Rewritten query:
SELECT * FROM person
WHERE HIERARCHICAL_TYPE_ID(pcol)=<<constant hierarchical type id of employee_t>>

Find all persons who are salaried or hourly employees.
SELECT * FROM person WHERE pcol IS OF (hourly_employee_t, salaried_employee_t)
Rewritten query:
SELECT * FROM person
WHERE
  (HIERARCHICAL_TYPE_ID(pcol)
HAS_PREFIX <<constant hierarchical type id of hourly_employeet>>
  OR
  HIERARCHICAL_TYPE_ID(pcol)
HAS_PREFIX <<constant hierarchical type id of salaried_employee_t>>)

It is contemplated that an overloaded version of the function TYPE_ID( ) can be added to return the built-in type id of a UDT expression.

It is further contemplated that an overloaded version of the function TYPE_NAME( ) can be added for a single varbinary hierarchical type id (htid) argument to return the string name for the type with that htid. The example below shows how to count the occurrences of each distinct type in a hierarchy in a table.

Count the number of persons of each type
SELECT TYPE_NAME(TYPE_ID(pcol)), TYPE_ID(pcol), count(*)
FROM person
GROUP BY TYPE_NAME(TYPE_ID(pcol)), TYPE_ID (pcol)

A compression scheme can be provided for hierarchical type ids. This would reduce the size of index keys size built from hierarchical type ids. For example encode them as base-254 integers (with digits as byte values 0-254 decimal) and use the byte 255 as a separator. Then a hierarchical type id would be of the form:
  <typeid><separator><typeid><separator> . . . <separator><typeid>

In many situations, this would result in only 2 or 3 bytes per typeid on the path instead of 4.

A type subsumption capability can be added to query rewrite when the type_list in a type predicate has more than one entry. For example,
  UDT_expression IS OF(person_t,employee_t)
is equivalent to
  UDT_expression IS OF(person_t)
because employee_t is a subtype of person_t.

CONCLUSION

The various systems, methods, and techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary embodiments of the invention are described in the context of digital devices emulating the functionality of personal computers, one skilled in the art will recognize that the present invention is not limited to such digital devices, as described in the present application may apply to any number of existing or emerging computing devices or environments, such as a gaming console, handheld computer, portable computer, etc. whether wired or wireless, and may be applied to any number of such computing devices connected via a communications network, and interacting across the network. Furthermore, it should be emphasized that a variety of computer platforms, including handheld device operating systems and other application specific operating systems, are herein contemplated, especially as the number of wireless networked devices continues to proliferate. Therefore, the present invention should not be limited to any single embodiment, but rather construed in breadth and scope in accordance with the appended claims.

What is claimed:
1. A method of generating a selectivity estimate of a hierarchy query over a plurality of objects, comprising:
receiving the hierarchy query over the plurality of objects, each object of the plurality of objects having an asso- ciated type, each type having an identifier, said each type being extensible using an inheritance extension, and said each type is a user defined type (UDT);

encoding said each object of the plurality of objects with a type path derived from the identifier, wherein said type path comprises a variable-length encoded value, and said variable-length encoded value corresponds to a hierarchy level of a type of an associated object;

storing results of the encoding in a column;

creating a histogram of the column by using encoded objects;

for said each object, determining if a type path of said each object satisfies the query by using the histogram;

generating a selectivity estimate of the hierarchy query of the objects by dividing a number of matching objects by a sum of a number of matching objects and a number of non-matching objects, wherein the matching objects have the type path that satisfies the query; and outputting the selectivity estimate of the hierarchy query to a storage device.

2. The method of claim 1, further comprising determining which type paths will satisfy the query.

3. The method of claim 1, further comprising encoding the query so that the query has a type that can be satisfied.

4. The method of claim 1, wherein each type can be a subtype of another type.

5. The method of claim 1, wherein each object has an associated type in a hierarchy of types.

* * * * *